(12) United States Patent
Yang et al.

(10) Patent No.: US 10,303,474 B2
(45) Date of Patent: May 28, 2019

(54) DATA READ/WRITE METHOD AND APPARATUS, STORAGE DEVICE, AND COMPUTER SYSTEM

(71) Applicant: Huawei Technologies Co., Ltd., Shenzhen, Guangdong (CN)

(72) Inventors: Huilian Yang, Shanghai (CN); Lei Lu, Shanghai (CN); Dai Shi, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 62 days.

(21) Appl. No.: 15/462,057

(22) Filed: Mar. 17, 2017

(65) Prior Publication Data

US 2017/0185401 A1 Jun. 29, 2017

Related U.S. Application Data

(63) Continuation of application No. PCT/CN2014/086925, filed on Sep. 19, 2014.

(51) Int. Cl.
*G06F 9/312* (2018.01)
*G06F 9/46* (2006.01)
*G06F 9/50* (2006.01)
*G06F 15/80* (2006.01)
*G06F 13/28* (2006.01)
(Continued)

(52) U.S. Cl.
CPC .......... *G06F 9/3009* (2013.01); *G06F 9/3004* (2013.01); *G06F 9/38* (2013.01);
(Continued)

(58) Field of Classification Search
CPC .. G06F 9/3009; G06F 9/3004; G06F 9/30043; G06F 9/38; G06F 9/3887; G06F 9/4881; G06F 9/4843; G06F 9/5061; G06F 9/5066; G06F 9/5072; G06F 9/5077; G06F 9/52; G06F 13/28; G06F 13/42; G06F 15/80
(Continued)

(56) References Cited

U.S. PATENT DOCUMENTS 7,925,860 B1 * 4/2011 Juffa ..................... G06F 9/3455
712/10
2010/0005470 A1 * 1/2010 Simon ..................... G06F 13/30
718/103
(Continued)

FOREIGN PATENT DOCUMENTS

CN 101114272 A 1/2008
CN 101131652 A 2/2008
(Continued)

*Primary Examiner* — Daniel H Pan

(57) ABSTRACT

Embodiments of the present invention provide a data read/write method and apparatus, a storage device, and a computer system, so as to reduce completion time of a data read/write operation in a multi-core computer system. The method includes: determining, by a host device, N cores used for executing a target process, where the N cores are in a one-to-one correspondence with N execution threads included in the target process; grouping the N execution threads to determine M execution thread groups, and allocating an indication identifier to each execution thread group; and sending M data read/write instructions to a storage device, where each data read/write instruction includes an indication identifier of a corresponding execution thread group.

17 Claims, 5 Drawing Sheets

(51) Int. Cl.
*G06F 9/30* (2018.01)
*G06F 9/38* (2018.01)
*G06F 13/42* (2006.01)
*G06F 9/48* (2006.01)
*G06F 9/52* (2006.01)

(52) U.S. Cl.
CPC ............ *G06F 9/5066* (2013.01); *G06F 13/28* (2013.01); *G06F 13/42* (2013.01); *G06F 9/3887* (2013.01); *G06F 9/4843* (2013.01); *G06F 9/4881* (2013.01); *G06F 9/5061* (2013.01); *G06F 9/5072* (2013.01); *G06F 9/5077* (2013.01); *G06F 9/52* (2013.01); *G06F 15/80* (2013.01)

(58) Field of Classification Search
USPC .............. 712/11, 15, 22, 225; 718/102, 106; 710/22
See application file for complete search history.

(56) References Cited

U.S. PATENT DOCUMENTS

| | | | |
|---|---|---|---|
| 2011/0087860 A1* | 4/2011 | Nickolls | ................. G06F 9/522 712/22 |
| 2013/0212594 A1 | 8/2013 | Choi et al. | |
| 2015/0293807 A1* | 10/2015 | Ralston | ............... G06F 11/0757 714/37 |

FOREIGN PATENT DOCUMENTS

| | | |
|---|---|---|
| CN | 101751295 A | 6/2010 |
| CN | 102193779 A | 9/2011 |
| CN | 103279445 A | 9/2013 |
| CN | 103838552 A | 6/2014 |
| WO | 2014/021995 A1 | 2/2014 |

* cited by examiner

200

A storage device receives M data read/write instructions sent by a host device, where the M data read/write instructions are in a one-to-one correspondence with M execution thread groups, each data read/write instruction includes an indication identifier of a corresponding execution thread group, one indication identifier is used to identify one execution thread group, the M execution thread groups are determined by the host device by grouping N execution threads included in a target process, N cores that are determined by the host device and that are used for executing the target process are in a one-to-one correspondence with the N execution threads, N≥2, one execution thread belongs to only one execution thread group, one execution thread group includes at least one execution thread, and M≥2 — S210

Determine, according to the indication identifier, a data read/write instruction corresponding to each execution thread group — S220

Transmit each data read/write instruction to the corresponding execution thread group, to enable each execution thread to perform a data read/write operation in the storage device according to the obtained data read/write instruction — S230

FIG. 3

DATA READ/WRITE METHOD AND APPARATUS, STORAGE DEVICE, AND COMPUTER SYSTEM

CROSS-REFERENCE TO RELATED APPLICATIONS

This application is a continuation of the International Application No. PCT/CN2014/086925, filed on Sep. 19, 2014, the disclosure of which is hereby incorporated by reference in its entirety.

TECHNICAL FIELD

The present invention relates to the computer field, and more specifically, to a data read/write method and apparatus, a storage device, and a computer system.

BACKGROUND

In a computer system that includes multiple cores, data that is read or written between a core and a storage device may need to be forwarded by another core, that is, a data read/write operation needs to be cooperatively performed by cores. However, there is a relatively large data transmission delay between the cores. The relatively large data transmission delay severely affects completion time of the data read/write operation, and further affects completion time of an entire task (for example, signal processing).

Therefore, a technology that can reduce completion time of a data read/write operation in a multi-core computer system is expected.

SUMMARY

Embodiments of the present invention provide a data read/write method and apparatus and a system, so as to reduce completion time of a data read/write operation in a multi-core computer system.

According to a first aspect, a data read/write method is provided, where the method includes: determining, by a host device, N cores used for executing a target process, where the N cores are in a one-to-one correspondence with N execution threads included in the target process, and N≥2; grouping the N execution threads to determine M execution thread groups, and allocating an indication identifier to each execution thread group, where one indication identifier is used to identify one execution thread group, one execution thread belongs to only one execution thread group, one execution thread group includes at least one execution thread, and N≥2; and sending M data read/write instructions to a storage device, where the M data read/write instructions are in a one-to-one correspondence with the M execution thread groups, and each data read/write instruction includes an indication identifier of a corresponding execution thread group, so that the storage device determines, according to the indication identifier included in each data read/write instruction, the execution thread group corresponding to each data read/write instruction, and transmits each data read/write instruction to the corresponding execution thread group, so that each execution thread can perform a data read/write operation on the storage device according to the data read/write instruction obtained from the storage device.

With reference to the first aspect, in a first implementation manner of the first aspect, data transmission between each execution thread and the storage device is performed based on the Direct Memory Access DMA protocol.

With reference to the first aspect and the foregoing implementation manner of the first aspect, in a second implementation manner of the first aspect, the sending M data read/write instructions to a storage device includes: sending a data read/write signal to the storage device, where the data read/write signal includes M signal components, the M signal components are in a one-to-one correspondence with the M data read/write instructions, and each data read/write instruction is carried in a corresponding signal component.

With reference to the first aspect and the foregoing implementation manners of the first aspect, in a third implementation manner of the first aspect, the sending M data read/write instructions to a storage device includes: sending the M data read/write instructions to the storage device by using a main control thread included in the target process.

With reference to the first aspect and the foregoing implementation manners of the first aspect, in a fourth implementation manner of the first aspect, the grouping the N execution threads includes: determining expected completion duration of the target process and a data transmission delay between the cores; and grouping the N execution threads according to the expected completion duration and the data transmission delay.

According to a second aspect, a data read/write method is provided, where the method includes: receiving, by a storage device, M data read/write instructions sent by a host device, where the M data read/write instructions are in a one-to-one correspondence with M execution thread groups, each data read/write instruction includes an indication identifier of a corresponding execution thread group, one indication identifier is used to identify one execution thread group, the M execution thread groups are determined by the host device by grouping N execution threads included in a target process, N cores that are determined by the host device and that are used for executing the target process are in a one-to-one correspondence with the N execution threads, N≥2, one execution thread belongs to only one execution thread group, one execution thread group includes at least one execution thread, and N≥2; and determining, according to the indication identifier, a data read/write instruction corresponding to each execution thread group, and transmitting each data read/write instruction to the corresponding execution thread group, so that each execution thread can perform a data read/write operation on the storage device according to the obtained data read/write instruction.

With reference to the second aspect, in a first implementation manner of the second aspect, data transmission between each execution thread and the storage device is performed based on the Direct Memory Access DMA protocol.

With reference to the second aspect and the foregoing implementation manner of the second aspect, in a second implementation manner of the second aspect, the receiving M data read/write instructions sent by a host device includes: receiving a data read/write signal sent by the host device, where the data read/write signal includes M signal components, the M signal components are in a one-to-one correspondence with the M data read/write instructions, and each data read/write instruction is carried in a corresponding signal component.

With reference to the second aspect and the foregoing implementation manners of the second aspect, in a third implementation manner of the second aspect, the receiving M data read/write instructions sent by a host device includes: receiving the M data read/write instructions sent by a main control thread included in the target process.

With reference to the second aspect and the foregoing implementation manners of the second aspect, in a fourth implementation manner of the second aspect, the M execution thread groups are specifically determined by the host device by grouping the N execution threads according to expected completion duration of the target process and a data transmission delay between the cores.

According to a third aspect, a data read/write apparatus is provided, where the apparatus includes: a determining unit, configured to determine N cores used for executing a target process, where the N cores are in a one-to-one correspondence with N execution threads included in the target process, and N≥2; a grouping unit, configured to group the N execution threads to determine M execution thread groups, where one execution thread belongs to only one execution thread group, one execution thread group includes at least one execution thread, and M≥2; and a sending unit, configured to send M data read/write instructions to a storage device, where the M data read/write instructions are in a one-to-one correspondence with the M execution thread groups, each data read/write instruction includes an indication identifier of a corresponding execution thread group, and one indication identifier is used to exclusively identify one execution thread group, so that the storage device transmits each data read/write instruction to the corresponding execution thread group according to each indication identifier, so that each execution thread can perform a data read/write operation on the storage device according to the data read/write instruction obtained from the storage device.

With reference to the third aspect, in a first implementation manner of the third aspect, data transmission between each execution thread and the storage device is performed based on the Direct Memory Access DMA protocol.

With reference to the third aspect and the foregoing implementation manner of the third aspect, in a second implementation manner of the third aspect, the sending unit is specifically configured to send a data read/write signal to the storage device, where the data read/write signal includes M signal components, the M signal components are in a one-to-one correspondence with the M data read/write instructions, and each data read/write instruction is carried in a corresponding signal component.

With reference to the third aspect and the foregoing implementation manners of the third aspect, in a third implementation manner of the third aspect, the sending unit is specifically configured to send the M data read/write instructions to the storage device by using a main control thread included in the target process.

With reference to the third aspect and the foregoing implementation manners of the third aspect, in a fourth implementation manner of the third aspect, the grouping unit is specifically configured to group the N execution threads according to expected completion duration of the target process and a data transmission delay between the cores.

With reference to the third aspect and the foregoing implementation manners of the third aspect, in a fifth implementation manner of the third aspect, the data read/write apparatus is a host device in a computer system.

According to a fourth aspect, a storage device is provided, including: a transmission interface, configured to perform communication between the storage device and a host device; storage space, configured to store data; and a controller, configured to: receive, by using the transmission interface, M data read/write instructions sent by the host device, where the M data read/write instructions are in a one-to-one correspondence with M execution thread groups, each data read/write instruction includes an indication identifier of a corresponding execution thread group, one indication identifier is used to identify one execution thread group, the M execution thread groups are determined by the host device by grouping N execution threads included in a target process, N cores that are determined by the host device and that are used for executing the target process are in a one-to-one correspondence with the N execution threads, N≥2, one execution thread belongs to only one execution thread group, one execution thread group includes at least one execution thread, and M≥2; and determine, according to the indication identifier, a data read/write instruction corresponding to each execution thread group, and transmit each data read/write instruction to the corresponding execution thread group by using the transmission interface, so that each execution thread can perform a data read/write operation on the storage space according to the obtained data read/write instruction.

With reference to the fourth aspect, in a first implementation manner of the fourth aspect, data transmission between each execution thread and the storage device is performed based on the Direct Memory Access DMA protocol.

With reference to the fourth aspect and the foregoing implementation manner of the fourth aspect, in a second implementation manner of the fourth aspect, the receiving unit is specifically configured to receive a data read/write signal sent by the host device, where the data read/write signal includes M signal components, the M signal components are in a one-to-one correspondence with the M data read/write instructions, and each data read/write instruction is carried in a corresponding signal component.

With reference to the fourth aspect and the foregoing implementation manners of the fourth aspect, in a third implementation manner of the fourth aspect, the controller is specifically configured to receive, by using the transmission interface, a data read/write signal sent by the host device, where the data read/write signal includes M signal components, the M signal components are in a one-to-one correspondence with the M data read/write instructions, and each data read/write instruction is carried in a corresponding signal component.

With reference to the fourth aspect and the foregoing implementation manners of the fourth aspect, in a fourth implementation manner of the fourth aspect, the M execution thread groups are specifically determined by the host device by grouping the N execution threads according to expected completion duration of the target process and a data transmission delay between the cores.

According to a fifth aspect, a computer system is provided, including: a bus; a host device connected to the bus, configured to: determine N cores used for executing a target process, where the N cores are in a one-to-one correspondence with N execution threads included in the target process, and N≥2 group the N execution threads to determine M execution thread groups, and allocate an indication identifier to each execution thread group, where one indication identifier is used to identify one execution thread group, one execution thread belongs to only one execution thread group, one execution thread group includes at least one execution thread, and M≥2; and send M data read/write instructions to a storage device by using the bus, where the M data read/write instructions are in a one-to-one correspondence with the M execution thread groups, each data read/write instruction includes an indication identifier of a corresponding execution thread group, and one indication identifier is used to exclusively identify one execution thread group; and a storage device connected to the bus, configured to: receive the M data read/write instructions by using the bus; and determine, according to the indication identifier, a data read/write instruction corresponding to each execution thread group, and transmit each data read/write instruction to the corresponding execution thread group, so that each execution thread can perform a data read/write operation on the storage device according to the obtained data read/write instruction.

With reference to the fifth aspect, in a first implementation manner of the fifth aspect, the M execution thread groups are determined by the host device by grouping the N execution threads according to expected completion duration of the target process and a data transmission delay between the cores.

According to the data read/write method and apparatus, the storage device, and the computer system in the present invention, a host device groups N cores used for executing a target process, groups N execution threads corresponding to the N cores to determine M execution thread groups, and adds, to a data read/write instruction sent to a storage device, an indication identifier of an execution thread group corresponding to the data read/write instruction. In this way, the storage device can identify, according to the indication identifier, the thread group corresponding to the data read/write instruction, and then the storage device can forward the data read/write instruction to the thread group corresponding to the data read/write instruction, so that each execution thread can perform a data read/write operation on the storage device according to the data read/write instruction obtained from the storage device. Therefore, signaling and data transmission between the cores during the data read/write operation can be reduced, and then a processing delay caused by the signaling and data transmission is reduced, thereby reducing completion time of the data read/write operation in a multi-core computer system.

BRIEF DESCRIPTION OF THE DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

FIG. 3 is a schematic structural diagram of a data read/write apparatus according to another embodiment of the present invention;

DETAILED DESCRIPTION

Figure 1:
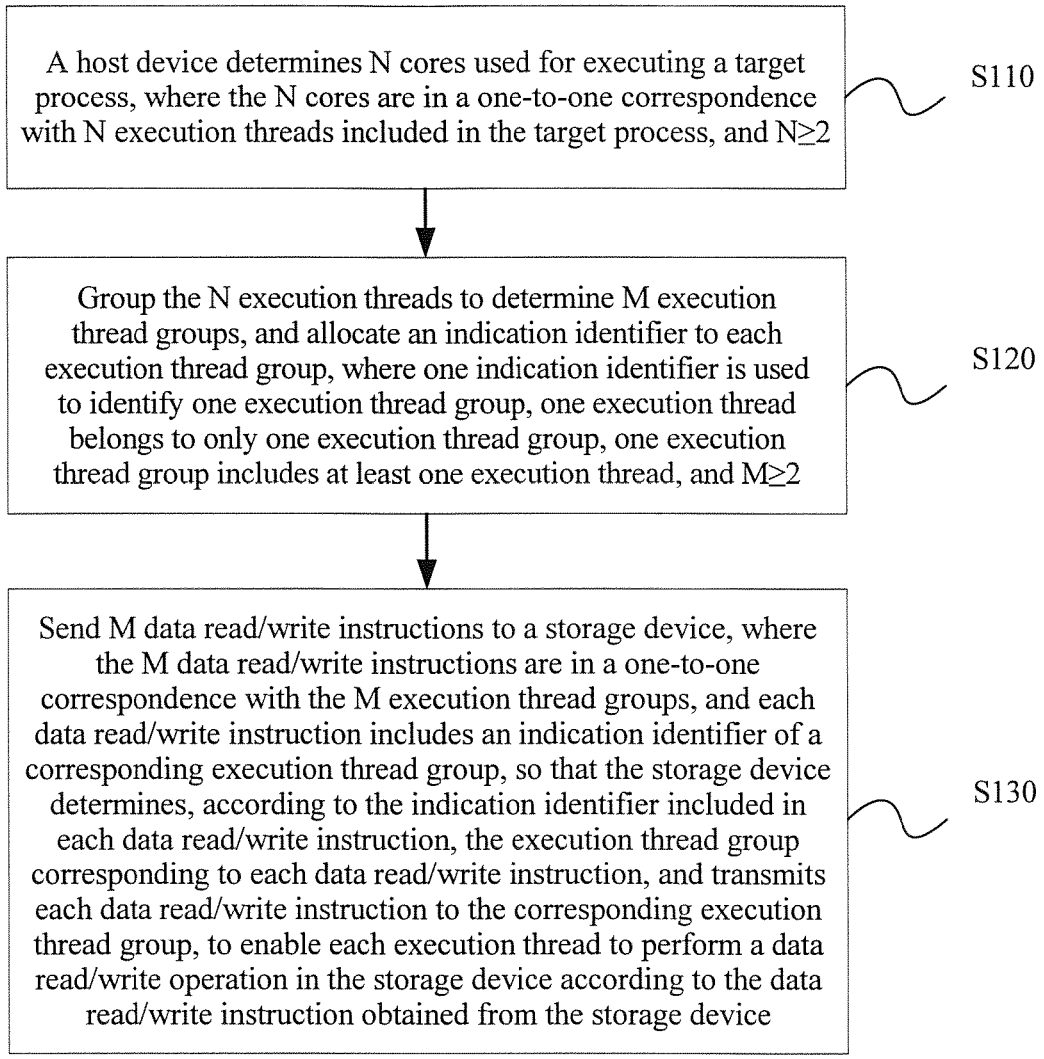
FIG. 1 is a schematic structural diagram of a data read/write apparatus according to an embodiment of the present invention.

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

The technical solutions in the present invention may be run on a hardware device that includes, for example, a CPU, a memory management unit (MMU), and a memory. An operating system running on the hardware device may be any computer operating system that implements service processing by using a thread or a process (including multiple threads), for example, a Linux system or a Unix system.

A data read/write apparatus in the present invention may be applied to a computer system, and is specifically configured to perform a data read/write operation. For example, the data read/write operation may be a data read/write operation performed on a cache device (an example of a storage device) when a central processing unit (CPU, Central Processing Unit) controls each thread to perform operation processing. Alternatively, the data read/write operation may be a data read/write operation performed on a disk device (another example of the storage device) by the CPU. This is not limited in the present invention. For ease of understanding, a process of the data read/write operation performed on the cache device is used as an example below to describe a data read/write method and apparatus and a system in the embodiments of the present invention in detail.

In addition, an example of the computer system may be a real-time operating system (RTOS, Real-time operating system), which is also referred to as an instant operating system. The real-time operating system refers to an operating system that can accept an external event that occurs or generated data and perform processing at a high enough speed and whose processing result can be used to control a production process or quickly respond to a processing system in a specified time, and used to control all real-time tasks to run in a coordinated manner. Compared with a general operating system, a key feature of the real-time operating system is "real-timeness", that is, if a task needs to be executed, the real-time operating system immediately (in a relatively short period of time) completes the task without a relatively long delay.

It should be understood that the real-time operating system described above is only an example of the computer system. This is not limited in the present invention. For ease of understanding and description, an application in the real-time operating system is used as an example below to describe the data read/write method and apparatus and the system in the embodiments of the present invention in detail.

FIG. 1 shows a schematic block diagram of a data read/write method 100 according to an embodiment of the present invention. As shown in FIG. 1, the method 100 includes the following steps:

S110. A host device determines N cores used for executing a target process, where the N cores are in a one-to-one correspondence with N execution threads included in the target process, and S120. Group the N execution threads to determine M execution thread groups, and allocate an indication identifier to each execution thread group, where one indication identifier is used to identify one execution thread group, one execution thread belongs to only one execution thread group, one execution thread group includes at least one execution thread, and S130. Send M data read/write instructions to a storage device, where the M data read/write instructions are in a one-to-one correspondence with the M execution thread groups, and each data read/write instruction includes an indication identifier of a corresponding execution thread group, so that the storage device determines, according to the indication identifier included in each data read/write instruction, the execution thread group corresponding to each data read/write instruction, and transmits each data read/write instruction to the corresponding execution thread group, so that each execution thread can perform a data read/write operation on the storage device according to the data read/write instruction obtained from the storage device.

First, a host device in a computer system may be used as an example for performing the method 100. In addition, the host device includes multiple CPUs (or cores). The multiple CPUs may operate collaboratively to complete a target task. For example, each CPU may run some (one or more) threads that are in a process and that are corresponding to the target task. The multiple CPUs are connected to and communicate with each other, so that data sharing may be implemented by means of signal switching, or the like.

In addition, the computer system further includes a storage device. The storage device is configured to provide a storage function. When executing the target task, the host device may access storage space in the storage device, and perform a read/write operation (or storage operation) on a signal, data, or the like generated during target task execution. In this embodiment of the present invention, the storage device may support various storage media. Optionally, the storage device may further include a storage interface expansion module, and may be connected to at least one solid state disk (SSD, Solid State Disk) and/or hybrid hard disk (HHD, Hybrid Hard Disk), so that a capacity of the storage device may be expanded according to a requirement.

In this embodiment of the present invention, the host device and the storage device may be connected by using various computer interfaces that can implement data transmission, such as a Peripheral Component Interconnect Express (PCIE, Peripheral Component Interconnect Express) interface, a Thunderbolt (Thunderbolt) interface, an Infiniband (Infiniband) interface, a high-speed Universal Serial Bus (USB, Universal Serial Bus) interface, and a high-speed Ethernet interface.

The following separately describes all steps of the method 100 in detail.

In S110, when the host device determines that a target task needs to be executed, N CPUs (that is, the cores) used for executing the target task (that is, the target process) may be determined from all CPUs included in the host device. For ease of understanding and description, the N CPUs used for executing the target task are marked as a CPU#1 to a CPU#N below.

By way of example and not limitation, the host device may determine a specific value of "N" according to operation amount required for executing the target task. For example, if the operation amount required by the target task is relatively large, the value of "N" may be relatively large, so that the task can be quickly completed. If the operation amount required by the target task is relatively small, and the task can be quickly completed by using only a relatively small quantity of CPUs, the value of "N" may be relatively small.

In addition, the CPU#1 to the CPU#N may be respectively used for executing N threads (that is, the execution threads) of the target task. For ease of understanding and description, the N threads are marked as a thread#1 to a thread#N below, that is, the CPU#1 to the CPU#N are in a one-to-one correspondence with the thread#1 to the thread#N. By way of example and not limitation, a correspondence rule of the foregoing "one-to-one correspondence" may be as follows: One CPU is configured to control running of a thread with a sequence number the same as that of the CPU.

It should be understood that the foregoing method used by the host device to determine the N CPUs used for executing the target task and the used parameters are only examples. This is not limited in the present invention. For example, quantities of CPUs used for executing all tasks may be the same by default according to a preset value. For example, the preset value may be a sum of all CPUs included in the host device.

It should be noted that the present invention is intended to eliminate impact caused by a data transmission delay between CPUs on completion time of a data read/write operation. Therefore, when N≥2, a technical effect of the present invention can be fully reflected. The technical effect is described later.

Figure 2:
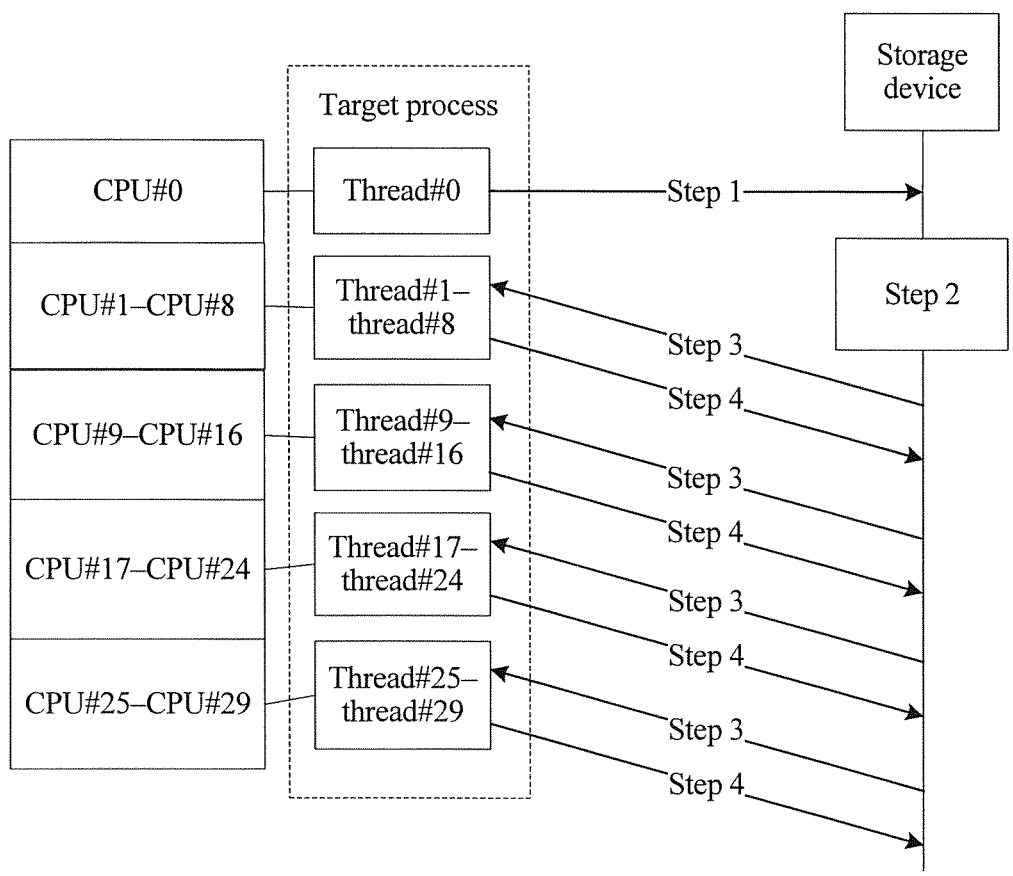
FIG. 2 is a schematic diagram of a data read/write procedure according to an embodiment of the present invention.

FIG. 2 is a schematic diagram of a data read/write procedure according to an embodiment of the present invention. In an example shown in FIG. 2, N is 29, that is, the host device determines that 29 CPUs are used to execute the target process, and the target process includes 29 execution threads.

Then, in S120, the host device may group the determined CPU#1 to CPU#N into M CPU groups; that is, the host device is configured to group the thread#1 to the thread#N that are corresponding to the determined CPU#1 to CPU#N into M thread groups. For example, the following rule may be used as a grouping basis.

Optionally, the grouping the N execution threads includes:

determining expected completion duration of the target process and a data transmission delay between the cores; and grouping the N execution threads according to the expected completion duration and the data transmission delay.

Specifically, the host device may determine a data transmission delay between the CPU#1 to the CPU#N. For example, information such as models and connection manners of the CPU#1 to the CPU#N may be obtained, so that the data transmission delay between the CPU#1 to the CPU#N may be calculated according to the information.

It should be understood that the foregoing method used by the host device to determine the data transmission delay between the CPU#1 to the CPU#N and the used parameters are only examples. This is not limited in the present invention. For example, the data transmission delay between the CPU#1 to the CPU#N may also be detected by performing a test.

In addition, the host device may further determine the expected completion duration of the target process. The target process needs to be completed in a specified time. The expected completion duration may be a period of time from starting of execution of the target process to ending of the execution of the target process (for example, a time when a CPU determines that the task is successfully executed and exits the process may be included). In addition, the expected completion duration may be less than or equal to the specified time.

By way of example and not limitation, the host device may determine the expected completion duration of the target process according to attribute information of the target process, such as a type and a processing priority. For example, if the type of the target process indicates that a service of the target process is a type of real-time service (for example, online gaming or a video call), it may be determined that the target process has a relatively high urgency degree, and needs to be completed in a relatively short period of time, and therefore it may be determined that the expected completion duration of the target process is relatively short (for example, less than a preset threshold). For another example, if the processing priority of the target process is marked as high, it may be determined that the target process has a relatively high urgency degree, and needs to be completed in a relatively short period of time, and therefore it may be determined that the expected completion duration of the target process is relatively short (for example, less than a preset threshold).

Therefore, the host device may group the CPU#1 to the CPU#N based on the determined data transmission delay between the CPU#1 to the CPU#N and the expected completion duration of the target process, so that completion duration that is of the target process and that includes a sum of data transmission delays between CPUs in all CPU groups is less than or equal to the expected completion duration of the target process. An example is given below.

The host device may calculate, according to processing capabilities of all the CPUs, duration of completing the target process when no data is transmitted between the CPUs, where the duration is referred to as reference completion duration of the target process below. Therefore, a difference between the expected completion duration of the target process and the reference completion duration of the target process may be obtained, and the CPU#1 to the CPU#N may be grouped based on the foregoing result, so that the sum of the data transmission delays between the CPUs in all the groups is less than or equal to the difference.

It should be understood that the grouping basis is only an example. This is not limited herein in the present invention. For example, the host device may also group the CPU#1 to the CPU#N into the M CPU groups based on a preset reference value K. In the M CPU groups, quantities of CPUs included in at least M−1 CPU groups are equal to the reference value K; that is, a quantity of CPUs included in a maximum of one CPU group is less than the reference value K. Needless to say, a quantity of CPUs included in each CPU group is an integer greater than 0.

In addition, in this embodiment of the present invention, the preset reference value K may be appropriately changed according to a parameter such as load of a computer system. For example, if current load of the computer system is relatively high, a relatively small K value may be used.

In the example shown in FIG. 2, K is 8. Therefore, the 29 CPUs are grouped into four CPU groups, that is, a CPU group#1 to a CPU group#4. The CPU group#1 includes eight CPUs, that is, the CPU#1 to the CPU#8; the CPU group#2 includes eight CPUs, that is, the CPU#9 to the CPU#16; the CPU group#3 includes eight CPUs, that is, the CPU#17 to the CPU#24; the CPU group#4 includes five CPUs, that is, the CPU#25 to the CPU#29.

Likewise, 29 threads (that is, the execution threads) are grouped into four thread groups, that is, a thread group#1 to a thread group#4. The thread group#1 includes eight threads, that is, the thread#1 to the thread#8; the thread group#2 includes eight threads, that is, the thread#9 to the thread#16; the thread group#3 includes eight threads, that is, the thread#17 to the thread#24; the thread group#4 includes five threads, that is, the thread#25 to the thread#29.

Then, in S130, the host device may send the M data read/write instructions to the storage device. Specifically, the host device may obtain a data read/write instruction from each CPU, and add an indication identifier to each data read/write instruction according to the CPU groups or thread groups obtained after the grouping, to indicate a CPU group from which each data read/write instruction comes, that is, a thread group corresponding to each data read/write instruction.

Therefore, the storage device may receive the M data read/write instructions by using a receiving unit, and may determine, by using a determining unit according to the indication identifier carried in each data read/write instruction, the thread group corresponding to each data read/write instruction, that is, the CPU group corresponding to each data read/write instruction.

Subsequently, the storage device may transmit, by using a sending unit according to an indication identifier carried in a data read/write instruction, the data read/write instruction to a thread group indicated by the indication identifier carried in the data read/write instruction. Therefore, each thread can obtain a read/write instruction from a corresponding CPU, and then can perform a data read/write operation in storage space of the storage device according to the data read/write instruction.

Optionally, data transmission between each execution thread and the storage device is performed based on the Direct Memory Access DMA protocol.

Specifically, direct memory access (DMA, Direct Memory Access) refers to a high-speed data transmission operation, and allows an external device to directly read/write data from/to a memory without using a CPU or requiring intervention from a CPU. For example, the entire data transmission operation may be performed under the control of a "DMA controller". In addition to performing processing at the beginning and end of the data transmission, a CPU may perform other work in a transmission process. That is, in this embodiment of the present invention, a DMA controller may also be configured in the computer system, and the DMA controller controls the data read/write operation performed on the storage device by each thread.

Basic operations for implementing DMA transmission are as follows:

(1) The DMA controller sends a DMA request to a CPU (belonging to the host device).

(2) The CPU responds to the DMA request, and the system changes to a DMA operating mode and grants bus control rights to the DMA controller.

(3) The DMA controller sends a memory address and determines a length of a to-be-transferred data block.

(4) The DMA transmission is performed.

(5) The DMA operation ends, and the bus control rights are returned to the CPU.

It should be understood that the DMA transmission implementation manner is only an example. This is not limited in the present invention. A DMA transmission implementation method in the prior art may also be used. For example, in this embodiment of the present invention, a function of the DMA controller may be implemented by using software or a program.

Optionally, the sending M data read/write instructions to a storage device includes:

sending a data read/write signal to the storage device, where the data read/write signal includes M signal components, the M signal components are in a one-to-one correspondence with the M data read/write instructions, and each data read/write instruction is carried in a corresponding signal component.

Specifically, the host device may add the data read/write instructions to a same signal (or signal flow) and send all the data read/write instructions to the storage device.

It should be understood that the method used by the host device to send the data read/write instructions to the storage device is only an example. This is not limited herein in the present invention. Each data read/write instruction may also be added to a separate signal and sent to the storage device.

Optionally, the sending M data read/write instructions to a storage device includes:

sending the M data read/write instructions to the storage device by using a main control thread included in the target process.

Specifically, in this embodiment of the present invention, a main control CPU and a main control thread corresponding to the main control CPU may be configured; that is, the main control CPU may determine all data read/write instructions of the CPU#1 to the CPU#N, and send the data read/write instructions to the storage device by using the main control thread.

Optionally, the main control thread is one of the execution threads.

Specifically, in this embodiment of the present invention, a CPU in the CPU#1 to the CPU#N may be selected as the main control CPU, and a thread corresponding to the main control CPU is the main control thread. That is, the main control thread not only can be used to transmit the data read/write instructions to the storage device, but also can be used to access the storage space of the storage device, so as to perform a data read/write operation.

The following describes the data read/write procedure in this embodiment of the present invention in detail with reference to FIG. 2.

In an embodiment shown in FIG. 2, 29 CPUs are used for executing a target process. The target process includes 29 execution threads. In addition, the 29 CPUs are grouped into four CPU groups, that is, a CPU group#1 to a CPU group#4. The CPU group#1 includes eight CPUs, that is, the CPU#1 to the CPU#8; the CPU group#2 includes eight CPUs, that is, the CPU#9 to the CPU#16; the CPU group#3 includes eight CPUs, that is, the CPU#17 to the CPU#24; the CPU group#4 includes five CPUs, that is, the CPU#25 to the CPU#29. Correspondingly, 29 threads (that is, the execution threads) are grouped into four thread groups, that is, a thread group#1 to a thread group#4. The thread group#1 includes eight threads, that is, the thread#1 to the thread#8; the thread group#2 includes eight threads, that is, the thread#9 to the thread#16; the thread group#3 includes eight threads, that is, the thread#17 to the thread#24; the thread group#4 includes five threads, that is, the thread#25 to the thread#29.

In addition, in the embodiment shown in FIG. 2, a CPU#0 is a main control CPU, and a thread#0 is a main control thread.

In step 1, the thread#0 sends a request signal to a memory. The request signal carries a data read/write request of each CPU that needs to perform a data read/write operation in this period, and each data read/write request carries an indication identifier of a corresponding thread group.

In step 2, a storage device may determine, according to the indication identifier carried in each data read/write request, the thread group corresponding to each data read/write request; and the storage device splits the request signal and generates, by using a thread group as a unit, a response signal corresponding to each thread group. Indication identifiers of data read/write instructions carried in each response signal point to a same thread group.

In step 3, the memory may send each response signal to a corresponding thread group according to the indication identifiers.

In step 4, each thread group may perform, under the control of a corresponding CPU group, a data read/write operation in the storage device according to a data read/write instruction from the storage device. A process of the data read/write operation may be similar to that in the prior art, and detailed description is omitted herein to avoid repetition.

In addition, in this embodiment of the present invention, the main control thread may detect a completion status of the data read/write operation performed by each thread group, and the main control thread may immediately end controlling a thread group after all threads in the thread group complete data read/write operations; or the main control thread may uniformly end controlling all thread groups after all threads in all the thread groups complete data read/write operations.

Alternatively, in this embodiment of the present invention, the storage device may detect a completion status of a data read/write operation in storage space of the storage device, and the storage device may immediately notify the main control thread after all threads in a thread group complete data read/write operations, so that the main control thread ends controlling the thread group; or the storage device may uniformly notify the main control thread after all threads in all thread groups complete data read/write operations, so that the main control thread ends controlling all the thread groups.

An important indicator for measuring a real-time operating system is time required by the system to complete a task after the task is received, and a change of the time is referred to as jitter. A primary objective of designing a real-time operating system is not to provide a high throughput, but to ensure that a task is completed in a particular time.

However, a current real-time operating system has limited support for multiple CPUs or multiple cores. The reason is that there is a relatively large data transmission delay between cores in a multi-core real-time operating system. Specifically, a non-interconnected (mesh) QuickPath Interconnect (QPI, QuickPath Interconnect) connection manner is usually used between CPUs. When multiple CPUs are required to cooperatively execute a real-time task, for example, when data that is read from or written into a cache device by a CPU needs to be forwarded by another CPU, a relatively large delay occurs, and a series of delay reactions occur. Consequently, an entire system cannot properly run, and when a task with relatively large operation amount is executed, only a limited quantity of cores can be used, execution time increases, and a requirement for a real-time operating system is not met.

In contrast, according to the data read/write method in the present invention, a host device groups N cores used for executing a target process, groups N execution threads corresponding to the N cores to determine M execution thread groups, and adds, to a data read/write instruction sent to a storage device, an indication identifier of an execution thread group corresponding to the data read/write instruction. In this way, the storage device can identify, according to the indication identifier, the thread group corresponding to the data read/write instruction, and then the storage device can forward the data read/write instruction to the thread group corresponding to the data read/write instruction, so that each execution thread can perform a data read/write operation on the storage device according to the data read/write instruction obtained from the storage device. Therefore, signaling and data transmission between the cores during the data read/write operation can be reduced, and then a processing delay caused by the signaling and data transmission is reduced, thereby reducing completion time of the data read/write operation in a multi-core computer system, and implementing extension performed by a real-time operating system on multiple CPUs.

FIG. 3 is a schematic flowchart of a data read/write method 200 according to another embodiment of the present invention. As shown in FIG. 3, the method 200 includes the following steps:

S210. A storage device receives M data read/write instructions sent by a host device, where the M data read/write instructions are in a one-to-one correspondence with M execution thread groups, each data read/write instruction includes an indication identifier of a corresponding execution thread group, one indication identifier is used to identify one execution thread group, the M execution thread groups are determined by the host device by grouping N execution threads included in a target process, N cores that are determined by the host device and that are used for executing the target process are in a one-to-one correspondence with the N execution threads, N≥2, one execution thread belongs to only one execution thread group, one execution thread group includes at least one execution thread, and M≥2.

S220. Determine, according to the indication identifier, a data read/write instruction corresponding to each execution thread group.

S230. Transmit each data read/write instruction to the corresponding execution thread group, so that each execution thread can perform a data read/write operation on the storage device according to the obtained data read/write instruction.

Optionally, the M execution thread groups are specifically determined by the host device by grouping the N execution threads according to expected completion duration of the target process and a data transmission delay between the cores.

Optionally, data transmission between each execution thread and the storage device is performed based on the Direct Memory Access DMA protocol.

Optionally, the receiving M data read/write instructions sent by a host device includes:

receiving a data read/write signal sent by the host device, where the data read/write signal includes M signal components, the M signal components are in a one-to-one correspondence with the M data read/write instructions, and each data read/write instruction is carried in a corresponding signal component.

Optionally, the receiving M data read/write instructions sent by a host device includes:

receiving the M data read/write instructions sent by the host device by using a main control thread included in the target process.

Optionally, the main control thread is one of the execution threads.

An entity for performing the data read/write method 200 according to this embodiment of the present invention may be corresponding to the foregoing memory. A specific procedure of the method is similar to the foregoing actions of the memory, and details are not described herein again.

According to the data read/write method in the present invention, a host device groups N cores used for executing a target process, groups N execution threads corresponding to the N cores to determine M execution thread groups, and adds, to a data read/write instruction sent to a storage device, an indication identifier of an execution thread group corresponding to the data read/write instruction. In this way, the storage device can identify, according to the indication identifier, the thread group corresponding to the data read/write instruction, and then the storage device can forward the data read/write instruction to the thread group corresponding to the data read/write instruction, so that each execution thread can perform a data read/write operation on the storage device according to the data read/write instruction obtained from the storage device. Therefore, signaling and data transmission between the cores during the data read/write operation can be reduced, and then a processing delay caused by the signaling and data transmission is reduced, thereby reducing completion time of the data read/write operation in a multi-core computer system, and implementing extension performed by a real-time operating system on multiple CPUs.

The data read/write method according to the embodiments of the present invention is described above in detail with reference to FIG. 1 to FIG. 3. The following describes a data read/write apparatus according to the embodiments of the present invention in detail with reference to FIG. 4 and FIG. 5.

Figure 4:
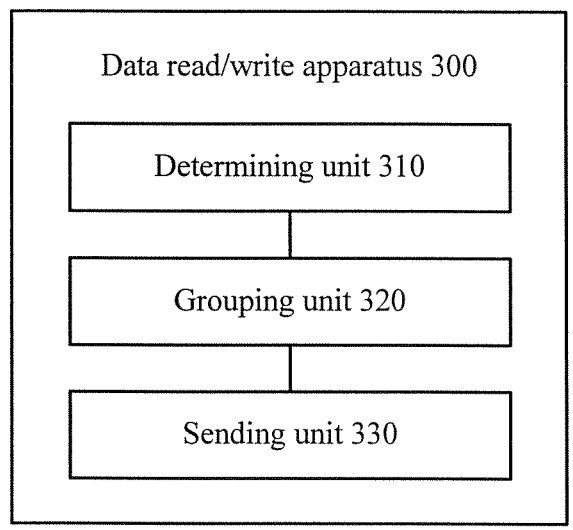
FIG. 4 is a schematic flowchart of a data read/write method according to an embodiment of the present invention.

FIG. 4 shows a schematic block diagram of a data read/write apparatus 300 according to an embodiment of the present invention. As shown in FIG. 4, the apparatus 300 includes:

a determining unit 310, configured to determine N cores used for executing a target process, where the N cores are in a one-to-one correspondence with N execution threads included in the target process, and N≥2;

a grouping unit 320, configured to group the N execution threads to determine M execution thread groups, and allocate an indication identifier to each execution thread group, where one indication identifier is used to identify one execution thread group, one execution thread belongs to only one execution thread group, one execution thread group includes at least one execution thread, and M≥2; and a sending unit 330, configured to send M data read/write instructions to a storage device, where the M data read/write instructions are in a one-to-one correspondence with the M execution thread groups, and each data read/write instruction includes an indication identifier of a corresponding execution thread group, so that the storage device transmits each data read/write instruction to the corresponding execution thread group according to each indication identifier, so that each execution thread can perform a data read/write operation on the storage device according to the data read/write instruction obtained from the storage device.

In addition, optionally, the data read/write apparatus is a host device in a computer system.

Specifically, an example of a host device in a computer system may be the apparatus 300. In addition, the host device includes multiple CPUs (or cores). The multiple CPUs may operate collaboratively to complete a target task. For example, each CPU may run some (one or more) threads that are in a process and that are corresponding to the target task. The multiple CPUs are connected to and communicate with each other, so that data sharing may be implemented by means of signal switching, or the like.

In addition, the computer system further includes a storage device. The storage device is configured to provide a storage function. When executing the target task, the host device may access storage space in the storage device, and perform a read/write operation (or storage operation) on a signal, data, or the like generated during target task execution. In this embodiment of the present invention, the storage device may support various storage media. Optionally, the storage device may further include a storage interface expansion module, and may be connected to at least one solid state disk (SSD, Solid State Disk) and/or hybrid hard disk (HHD, Hybrid Hard Disk), so that a capacity of the storage device may be expanded according to a requirement.

In this embodiment of the present invention, the host device and the storage device may be connected by using various computer interfaces that can implement data transmission, such as a Peripheral Component Interconnect Express (PCIE, Peripheral Component Interconnect Express) interface, a Thunderbolt (Thunderbolt) interface, an Infiniband (Infiniband) interface, a high-speed Universal Serial Bus (USB, Universal Serial Bus) interface, and a high-speed Ethernet interface.

The following separately describes functions of all units in the host device in detail.

A. The Determining Unit 310

When the host device determines that a target task needs to be executed, the determining unit 310 may determine, from all CPUs included in the host device, N CPUs (that is, the cores) used for executing the target task (that is, the target process). For ease of understanding and description, the N CPUs used for executing the target task are marked as a CPU#1 to a CPU#N below.

By way of example and not limitation, the determining unit 310 may determine a specific value of "N" according to operation amount required for executing the target task. For example, if the operation amount required by the target task is relatively large, to quickly complete the task, the determining unit 310 may determine that the value of "N" relatively large. If the operation amount required by the target task is relatively small, and the task can be quickly completed by using only a relatively small quantity of CPUs, the determining unit 310 may determine that the value of "N" relatively small.

In addition, the CPU#1 to the CPU#N may be respectively used for executing N threads (that is, the execution threads) of the target task. For ease of understanding and description, the N threads are marked as a thread#1 to a thread#N below, that is, the CPU#1 to the CPU#N are in a one-to-one correspondence with the thread#1 to the thread#N. By way of example and not limitation, a correspondence rule of the foregoing "one-to-one correspondence" may be as follows: One CPU is configured to control running of a thread with a sequence number the same as that of the CPU.

It should be understood that the foregoing method used by the determining unit 310 to determine the N CPUs used for executing the target task and the used parameters are only examples. This is not limited in the present invention. For example, the determining unit 310 may further determine, according to a preset value, that quantities of CPUs used for executing all tasks are the same by default. For example, the preset value may be a sum of all CPUs included in the host device.

It should be noted that the present invention is intended to eliminate impact caused by a data transmission delay between CPUs on completion time of a data read/write operation. Therefore, when N≥2, a technical effect of the present invention can be fully reflected. The technical effect is described later.

FIG. 2 is a schematic diagram of a data read/write procedure according to an embodiment of the present invention. In an example shown in FIG. 2, N is 29, that is, the determining unit 310 determines that 29 CPUs are used to execute the target process, and the target process includes 29 execution threads.

B. The Grouping Unit 320

The grouping unit 320 is configured to group the determined CPU#1 to CPU#N into M CPU groups; that is, the grouping unit 320 is configured to group the thread#1 to the thread#N that are corresponding to the determined CPU#1 to CPU#N into M thread groups. For example, the following rule may be used as a grouping basis.

Optionally, the grouping unit is specifically configured to group the N execution threads according to expected completion duration of the target process and a data transmission delay between the cores.

Specifically, the grouping unit 320 may determine a data transmission delay between the CPU#1 to the CPU#N. For example, the grouping unit 320 may obtain information such as models and connection manners of the CPU#1 to the CPU#N, so that the data transmission delay between the CPU#1 to the CPU#N may be calculated according to the information.

It should be understood that the foregoing method by the grouping unit 320 to determine the data transmission delay between the CPU#1 to the CPU#N and the used parameters are only examples. This is not limited in the present invention. For example, the grouping unit 320 may also detect the data transmission delay between the CPU#1 to the CPU#N by performing a test.

In addition, the grouping unit 320 may further determine the expected completion duration of the target process. The target process needs to be completed in a specified time. The expected completion duration may be a period of time from starting of execution of the target process to ending of the execution of the target process (for example, a time when a CPU determines that the task is successfully executed and exits the process may be included). In addition, the expected completion duration may be less than or equal to the specified time.

By way of example and not limitation, the grouping unit 320 may determine the expected completion duration of the target process according to attribute information of the target process, such as a type and a processing priority. For example, if the type of the target process indicates that a service of the target process is a type of real-time service (for example, online gaming or a video call), it may be determined that the target process has a relatively high urgency degree, and needs to be completed in a relatively short period of time, and therefore it may be determined that the expected completion duration of the target process is relatively short (for example, less than a preset threshold). For another example, if the processing priority of the target process is marked as high, it may be determined that the target process has a relatively high urgency degree, and needs to be completed in a relatively short period of time, and therefore it may be determined that the expected completion duration of the target process is relatively short (for example, less than a preset threshold).

Therefore, the grouping unit 320 may group the CPU#1 to the CPU#N based on the determined data transmission delay between the CPU#1 to the CPU#N and the expected completion duration of the target process, so that completion duration that is of the target process and that includes a sum of data transmission delays between CPUs in all CPU groups is less than or equal to the expected completion duration of the target process. An example is given below.

The grouping unit 320 may calculate, according to processing capabilities of all the CPUs, duration of completing the target process when no data is transmitted between the CPUs, where the duration is referred to as reference completion duration of the target process below. Therefore, a difference between the expected completion duration of the target process and the reference completion duration of the target process may be obtained, and the CPU#1 to the CPU#N may be grouped based on the foregoing result, so that the sum of the data transmission delays between the CPUs in all the groups is less than or equal to the difference.

It should be understood that the grouping basis is only an example. This is not limited in the present invention. For example, the grouping unit 320 may also group the CPU#1 to the CPU#N into the M CPU groups based on a preset reference value K. In the M CPU groups, quantities of CPUs included in at least M−1 CPU groups are equal to the reference value K; that is, a quantity of CPUs included in a maximum of one CPU group is less than the reference value K. Needless to say, a quantity of CPUs included in each CPU group is an integer greater than 0.

In addition, in this embodiment of the present invention, the preset reference value K may be appropriately changed according to a parameter such as load of a computer system. For example, if current load of the computer system is relatively high, a relatively small K value may be used.

In the example shown in FIG. 2, K is 8. Therefore, the 29 CPUs are grouped into four CPU groups, that is, a CPU group#1 to a CPU group#4. The CPU group#1 includes eight CPUs, that is, the CPU#1 to the CPU#8; the CPU group#2 includes eight CPUs, that is, the CPU#9 to the CPU#16; the CPU group#3 includes eight CPUs, that is, the CPU#17 to the CPU#24; the CPU group#4 includes five CPUs, that is, the CPU#25 to the CPU#29.

Likewise, 29 threads (that is, the execution threads) are grouped into four thread groups, that is, a thread group#1 to a thread group#4. The thread group#1 includes eight threads, that is, the thread#1 to the thread#8; the thread group#2 includes eight threads, that is, the thread#9 to the thread#16; the thread group#3 includes eight threads, that is, the thread#17 to the thread#24; the thread group#4 includes five threads, that is, the thread#25 to the thread#29.

C. The Sending Unit 330

The sending unit 330 is configured to send the M data read/write instructions to the storage device. Specifically, the sending unit 330 may obtain a data read/write instruction from each CPU, and add an indication identifier to each data read/write instruction according to the CPU groups or thread groups obtained after the grouping, to indicate a CPU group from which each data read/write instruction comes, that is, a thread group corresponding to each data read/write instruction.

Therefore, the storage device may receive the M data read/write instructions by using a receiving unit, and may determine, by using a determining unit according to the indication identifier carried in each data read/write instruction, the thread group corresponding to each data read/write instruction, that is, the CPU group corresponding to each data read/write instruction.

Subsequently, the storage device may transmit, by using a sending unit according to an indication identifier carried in a data read/write instruction, the data read/write instruction to a thread group indicated by the indication identifier carried in the data read/write instruction. Therefore, each thread can obtain a read/write instruction from a corresponding CPU, and then can perform a data read/write operation in storage space of the storage device according to the data read/write instruction.

Optionally, data transmission between each execution thread and the storage device is performed based on the Direct Memory Access DMA protocol.

Specifically, direct memory access (DMA, Direct Memory Access) refers to a high-speed data transmission operation, and allows an external device to directly read/write data from/to a memory without using a CPU or requiring intervention from a CPU. For example, the entire data transmission operation may be performed under the control of a "DMA controller". In addition to performing processing at the beginning and end of the data transmission, a CPU may perform other work in a transmission process. That is, in this embodiment of the present invention, the data read/write apparatus 300 may further include a DMA controller, and the DMA controller controls the data read/write operation performed on the storage device by each thread.

Basic operations for implementing DMA transmission are as follows:

(1) The DMA controller sends a DMA request to a CPU.

(2) The CPU responds to the DMA request, and the system changes to a DMA operating mode and grants bus control rights to the DMA controller.

(3) The DMA controller sends a memory address and determines a length of a to-be-transferred data block.

(4) The DMA transmission is performed.

(5) The DMA operation ends, and the bus control rights are returned to the CPU.

It should be understood that the DMA transmission implementation manner is only an example. This is not limited in the present invention. A DMA transmission implementation method in the prior art may also be used. For example, in this embodiment of the present invention, a function of the DMA controller may be implemented by using software or a program.

Optionally, the sending unit 330 is specifically configured to send a data read/write signal to the storage device, where the data read/write signal includes M signal components, the M signal components are in a one-to-one correspondence with the M data read/write instructions, and each data read/write instruction is carried in a corresponding signal component.

Specifically, the sending unit 330 may add the data read/write instructions to a same signal (or signal flow) and send all the data read/write instructions to the storage device.

It should be understood that the method used by the sending unit 330 to send the data read/write instructions to the storage device is only an example. This is not limited herein in the present invention. The sending unit 330 may also add each data read/write instruction to a separate signal and send the data read/write instruction to the storage device.

Optionally, the sending unit is specifically configured to send the M data read/write instructions to the storage device by using a main control thread included in the target process.

Specifically, in this embodiment of the present invention, a main control CPU and a main control thread corresponding to the main control CPU may be configured; that is, the main control CPU may determine all data read/write instructions of the CPU#1 to the CPU#N, and send the data read/write instructions to the storage device by using the main control thread.

Optionally, the main control thread is one of the execution threads.

Specifically, in this embodiment of the present invention, a CPU in the CPU#1 to the CPU#N may be selected as the main control CPU, and a thread corresponding to the main control CPU is the main control thread. That is, the main control thread not only can be used to transmit the data read/write instructions to the storage device, but also can be used to access the storage space of the storage device, so as to perform a data read/write operation.

The following describes the data read/write procedure in this embodiment of the present invention in detail with reference to FIG. 2.

In an embodiment shown in FIG. 2, 29 CPUs are used for executing a target process. The target process includes 29 execution threads. In addition, the 29 CPUs are grouped into four CPU groups, that is, a CPU group#1 to a CPU group#4. The CPU group#1 includes eight CPUs, that is, the CPU#1 to the CPU#8; the CPU group#2 includes eight CPUs, that is, the CPU#9 to the CPU#16; the CPU group#3 includes eight CPUs, that is, the CPU#17 to the CPU#24; the CPU group#4 includes five CPUs, that is, the CPU#25 to the CPU#29. Correspondingly, 29 threads (that is, the execution threads) are grouped into four thread groups, that is, a thread group#1 to a thread group#4. The thread group#1 includes eight threads, that is, the thread#1 to the thread#8; the thread group#2 includes eight threads, that is, the thread#9 to the thread#16; the thread group#3 includes eight threads, that is, the thread#17 to the thread#24; the thread group#4 includes five threads, that is, the thread#25 to the thread#29.

In addition, in the embodiment shown in FIG. 2, a CPU#0 is a main control CPU, and a thread#0 is a main control thread.

In step 1, the thread#0 sends a request signal to a memory. The request signal carries a data read/write request of each CPU that needs to perform a data read/write operation in this period, and each data read/write request carries an indication identifier of a corresponding thread group.

In step 2, a storage device may determine, according to the indication identifier carried in each data read/write request, the thread group corresponding to each data read/write request; and the storage device splits the request signal and generates, by using a thread group as a unit, a response signal corresponding to each thread group. Indication identifiers of data read/write instructions carried in each response signal point to a same thread group.

In step 3, the memory may send each response signal to a corresponding thread group according to the indication identifiers.

In step 4, each thread group may perform, under the control of a corresponding CPU group, a data read/write operation in the storage device according to a data read/write instruction from the storage device.

In addition, in this embodiment of the present invention, the main control thread may detect a completion status of the data read/write operation performed by each thread group, and the main control thread may immediately end controlling a thread group after all threads in the thread group complete data read/write operations; or the main control thread may uniformly end controlling all thread groups after all threads in all the thread groups complete data read/write operations.

Alternatively, in this embodiment of the present invention, the storage device may detect a completion status of a data read/write operation in storage space of the storage device, and the storage device may immediately notify the main control thread after all threads in a thread group complete data read/write operations, so that the main control thread ends controlling the thread group; or the storage device may uniformly notify the main control thread after all threads in all thread groups complete data read/write operations, so that the main control thread ends controlling all the thread groups.

An important indicator for measuring a real-time operating system is time required by the system to complete a task after the task is received, and a change of the time is referred to as jitter. A primary objective of designing a real-time operating system is not to provide a high throughput, but to ensure that a task is completed in a particular time.

However, a current real-time operating system has limited support for multiple CPUs or multiple cores. The reason is that there is a relatively large data transmission delay between cores in a multi-core real-time operating system. Specifically, a non-interconnected (mesh) QuickPath Interconnect (QPI, QuickPath Interconnect) connection manner is usually used between CPUs. When multiple CPUs are required to cooperatively execute a real-time task, for example, when data that is read from or written into a cache device by a CPU needs to be forwarded by another CPU, a relatively large delay occurs, and a series of delay reactions occur. Consequently, an entire system cannot properly run, and when a task with relatively large operation amount is executed, only a limited quantity of cores can be used, execution time increases, and a requirement for a real-time operating system is not met.

In contrast, according to the data read/write apparatus in the present invention, a host device groups N cores used for executing a target process, groups N execution threads corresponding to the N cores to determine M execution thread groups, and adds, to a data read/write instruction sent to a storage device, an indication identifier of an execution thread group corresponding to the data read/write instruction. In this way, the storage device can identify, according to the indication identifier, the thread group corresponding to the data read/write instruction, and then the storage device can forward the data read/write instruction to the thread group corresponding to the data read/write instruction, so that each execution thread can perform a data read/write operation on the storage device according to the data read/write instruction obtained from the storage device. Therefore, signaling and data transmission between the cores during the data read/write operation can be reduced, and then a processing delay caused by the signaling and data transmission is reduced, thereby reducing completion time of the data read/write operation in a multi-core computer system, and implementing extension performed by a real-time operating system on multiple CPUs.

Figure 5:
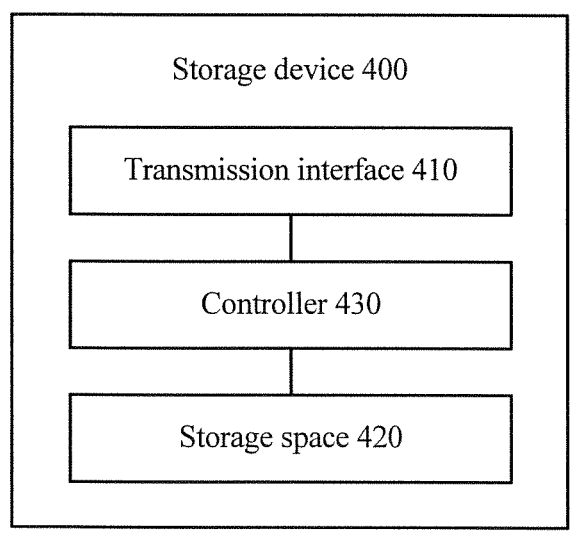
FIG. 5 is a schematic flowchart of a data read/write method according to another embodiment of the present invention.

FIG. 5 shows a schematic block diagram of a storage device 400 according to an embodiment of the present invention. As shown in FIG. 5, the storage device 400 includes:

a transmission interface 410, configured to perform communication between the storage device and a host device;

storage space 420, configured to store data; and a controller 430, configured to: receive, by using the transmission interface, M data read/write instructions sent by the host device, where the M data read/write instructions are in a one-to-one correspondence with M execution thread groups, each data read/write instruction includes an indication identifier of a corresponding execution thread group, one indication identifier is used to identify one execution thread group, the M execution thread groups are determined by the host device by grouping N execution threads included in a target process, N cores that are determined by the host device and that are used for executing the target process are in a one-to-one correspondence with the N execution threads, N≥2, one execution thread belongs to only one execution thread group, one execution thread group includes at least one execution thread, and M≥2; and determine, according to the indication identifier, a data read/write instruction corresponding to each execution thread group, and transmit each data read/write instruction to the corresponding execution thread group by using the transmission interface, so that each execution thread can perform a data read/write operation on the storage device 400 according to the obtained data read/write instruction.

Optionally, the M execution thread groups are specifically determined by the controller 430 by grouping the N execution threads according to expected completion duration of the target process and a data transmission delay between the cores.

Optionally, data transmission between each execution thread and the storage device is performed based on the Direct Memory Access DMA protocol.

Optionally, the controller 420 is specifically configured to receive, by using the transmission interface, a data read/write signal sent by the host device, where the data read/write signal includes M signal components, the M signal components are in a one-to-one correspondence with the M data read/write instructions, and each data read/write instruction is carried in a corresponding signal component.

Optionally, the M data read/write instructions are sent by the host device by using a main control thread included in the target process.

Optionally, the main control thread is one of the execution threads.

It should be noted that, in this embodiment of the present invention, after the storage device 400 sends the M data read/write instructions to the execution thread groups, a process of performing a data read/write operation in the storage space of the storage device according to a data read/write instruction from each execution thread group may be similar to a data read/write process in the prior art, and detailed description is omitted herein to avoid repetition.

In this embodiment of the present invention, the controller may implement or perform each step and each logical block diagram that are disclosed in the method embodiments of the present invention. The controller may be any conventional processor or the like. The steps of the methods disclosed in the embodiments of the present invention may be directly performed by a hardware processor, or performed by a combination of hardware and software modules in a decoding processor. The software module may be located in the storage space. The storage space may be a mature storage medium in this field, for example, a random access memory, a flash memory, a read-only memory, a programmable read-only memory, an electrically-erasable programmable memory, or a register. The controller reads information in the storage space, and completes the steps of the methods in combination with hardware of the controller.

The storage device 400 may be corresponding to the storage device in the foregoing description. In addition, functions of each module and unit included in the storage device 400 are similar to functions of a corresponding module or unit in the foregoing storage device, and detailed description is omitted herein to avoid repetition.

The storage device 400 may be a read-only memory or a random access memory, and provides an instruction and data to the host device. A part of the storage device 400 may further include a nonvolatile random access memory. For example, the storage device 400 may further store device type information.

According to the storage device in the present invention, a host device groups N cores used for executing a target process, groups N execution threads corresponding to the N cores to determine M execution thread groups, and adds, to a data read/write instruction sent to a storage device, an indication identifier of an execution thread group corresponding to the data read/write instruction. In this way, the storage device can identify, according to the indication identifier, the thread group corresponding to the data read/write instruction, and then the storage device can forward the data read/write instruction to the thread group corresponding to the data read/write instruction, so that each execution thread can perform a data read/write operation on the storage device according to the data read/write instruction obtained from the storage device. Therefore, signaling and data transmission between the cores during the data read/write operation can be reduced, and then a processing delay caused by the signaling and data transmission is reduced, thereby reducing completion time of the data read/write operation in a multi-core computer system, and implementing extension performed by a real-time operating system on multiple CPUs.

Figure 6:
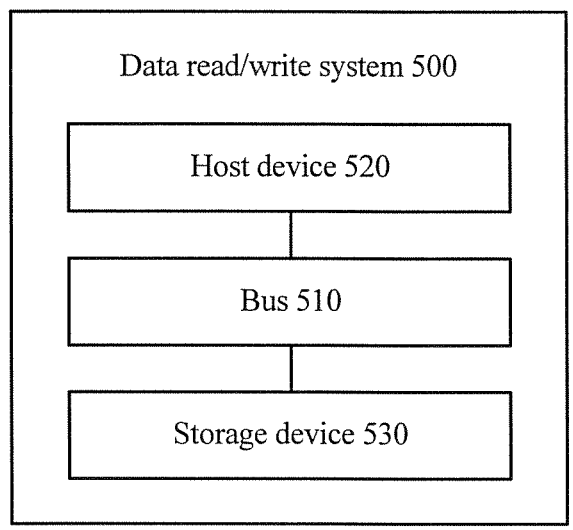
FIG. 6 is a schematic structural diagram of a data read/write system according to an embodiment of the present invention.

FIG. 6 is a schematic flowchart of a computer system 500 according to another embodiment of the present invention. As shown in FIG. 6, the computer system 500 includes:

a bus 510;

a host device 520 connected to the bus, configured to: determine N cores used for executing a target process, where the N cores are in a one-to-one correspondence with N execution threads included in the target process, and N≥2; group the N execution threads to determine M execution thread groups, and allocate an indication identifier to each execution thread group, where one indication identifier is used to identify one execution thread group, one execution thread belongs to only one execution thread group, one execution thread group includes at least one execution thread, and M≥2; and send M data read/write instructions to a storage device by using the bus 510, where the M data read/write instructions are in a one-to-one correspondence with the M execution thread groups, each data read/write instruction includes an indication identifier of a corresponding execution thread group, and one indication identifier is used to exclusively identify one execution thread group; and a storage device 530 connected to the bus, configured to: receive the M data read/write instructions by using the bus 510; and determine, according to the indication identifier, a data read/write instruction corresponding to each execution thread group, and transmit each data read/write instruction to the corresponding execution thread group, so that each execution thread can perform a data read/write operation on the storage device according to the obtained data read/write instruction.

Optionally, the M execution thread groups are determined by the host device by grouping the N execution threads according to expected completion duration of the target process and a data transmission delay between the cores.

Optionally, data transmission between each execution thread and the storage device is performed based on the Direct Memory Access DMA protocol.

The host device 520 may be corresponding to the data read/write apparatus 300 in the embodiments of the present invention. The storage device 530 may be corresponding to the data read/write apparatus 400 in the embodiments of the present invention. For brevity, a function of the storage device is not described herein.

According to the data read/write system in the present invention, a host device groups N cores used for executing a target process, groups N execution threads corresponding to the N cores to determine M execution thread groups, and adds, to a data read/write instruction sent to a storage device, an indication identifier of an execution thread group corresponding to the data read/write instruction. In this way, the storage device can identify, according to the indication identifier, the thread group corresponding to the data read/write instruction, and then the storage device can forward the data read/write instruction to the thread group corresponding to the data read/write instruction, so that each execution thread can perform a data read/write operation on the storage device according to the data read/write instruction obtained from the storage device. Therefore, signaling and data transmission between the cores during the data read/write operation can be reduced, and then a processing delay caused by the signaling and data transmission is reduced, thereby reducing completion time of the data read/write operation in a multi-core computer system, and implementing extension performed by a real-time operating system on multiple CPUs.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A data read/write method, comprising:
   determining, by a host device, N cores used for executing a target process, wherein each of the N cores is in a one-to-one correspondence with each of N execution threads comprised in the target process, and N≥2;
   grouping the N execution threads to determine M execution thread groups, wherein grouping the N execution threads comprises:
     determining an expected completion duration of the target process and a data transmission delay between the cores,
     grouping the N execution threads according to the expected completion duration and the data transmission delay, and
     allocating an indication identifier to each execution thread group, wherein one indication identifier is used to identify one execution thread group, one execution thread belongs to only one execution thread group, one execution thread group comprises at least one execution thread, and M≥2; and
   sending M data read/write instructions to a storage device, wherein the M data read/write instructions are in a one-to-one correspondence with the M execution thread groups, and each data read/write instruction comprises an indication identifier of a corresponding execution thread group, so that the storage device determines, according to the indication identifier comprised in each data read/write instruction, the execution thread group corresponding to each data read/write instruction, and transmits each data read/write instruction to the corresponding execution thread group, that to enable each execution thread within a thread group to perform a data read/write operation on the storage device according to the data read/write instruction obtained from the storage device.

2. The method according to claim 1, wherein data transmission between each execution thread and the storage device is performed based on the Direct Memory Access (DMA) protocol.

3. The method according to claim 1, wherein sending the M data read/write instructions to the storage device comprises:
   sending a data read/write signal to the storage device, wherein the data read/write signal comprises M signal components, the M signal components are in a one-to-one correspondence with the M data read/write instructions, and each data read/write instruction is carried in a corresponding signal component.

4. The method according to claim 1, wherein sending the M data read/write instructions to the storage device comprises:
sending the M data read/write instructions to the storage device by using a main control thread comprised in the target process.

5. The method according to claim 4, wherein the main control thread is one of the execution threads.

6. A data read/write method, comprising:
receiving, by a storage device, M data read/write instructions sent by a host device, wherein the M data read/write instructions are in a one-to-one correspondence with M execution thread groups, each data read/write instruction comprises an indication identifier of a corresponding execution thread group, one indication identifier is used to identify one execution thread group, the M execution thread groups are determined by the host device by grouping N execution threads comprised in a target process according to an expected completion duration of the target process and a data transmission delay between the cores, each of N cores that are determined by the host device and that are used for executing the target process is in a one-to-one correspondence with each of the N execution threads, N≥2, one execution thread belongs to only one execution thread group, one execution thread group comprises at least one execution thread, and M≥2;
determining, according to the indication identifier, a data read/write instruction corresponding to each execution thread group; and
transmitting each data read/write instruction to the corresponding execution thread group to enable each execution thread within a thread group to perform a data read/write operation on the storage device according to the obtained data read/write instruction.

7. The method according to claim 6, wherein data transmission between each execution thread and the storage device is performed based on the Direct Memory Access (DMA) protocol.

8. The method according to claim 6, wherein receiving the M data read/write instructions sent by the host device comprises:
receiving a data read/write signal sent by the host device, wherein the data read/write signal comprises M signal components, the M signal components are in a one-to-one correspondence with the M data read/write instructions, and each data read/write instruction is carried in a corresponding signal component.

9. The method according to claim 6, wherein receiving the M data read/write instructions sent by the host device comprises:
receiving the M data read/write instructions sent by the host device by using a main control thread comprised in the target process.

10. The method according to claim 9, wherein the main control thread is one of the execution threads.

11. A data read/write apparatus, comprising:
a determining unit, configured to determine N cores used for executing a target process, wherein each of the N cores is in a one-to-one correspondence with each of N execution threads comprised in the target process, and N≥2;
a grouping unit, configured to group the N execution threads to determine M execution thread groups, wherein the grouping unit is configured to group the N execution threads according to an expected completion duration of the target process and a data transmission delay between the cores, and allocate an indication identifier to each execution thread group, wherein one indication identifier is used to identify one execution thread group, one execution thread belongs to only one execution thread group, one execution thread group comprises at least one execution thread, and M≥2; and
a sending unit, configured to send M data read/write instructions to a storage device, wherein the M data read/write instructions are in a one-to-one correspondence with the M execution thread groups, and each data read/write instruction comprises an indication identifier of a corresponding execution thread group to enable the storage device to transmit each data read/write instruction to the corresponding execution thread group according to each indication identifier, to enable each execution thread within a thread group to perform a data read/write operation on the storage device according to the data read/write instruction obtained from the storage device.

12. The apparatus according to claim 11, wherein data transmission between each execution thread and the storage device is performed based on the Direct Memory Access (DMA) protocol.

13. The apparatus according to claim 11, wherein the sending unit is configured to send a data read/write signal to the storage device, the data read/write signal comprises M signal components, the M signal components are in a one-to-one correspondence with the M data read/write instructions, and each data read/write instruction is carried in a corresponding signal component.

14. The apparatus according to claim 11, wherein the sending unit is configured to send the M data read/write instructions to the storage device by using a main control thread comprised in the target process.

15. The apparatus according to claim 14, wherein the main control thread is one of the execution threads.

16. The apparatus according to claim 11, wherein the apparatus is a host device in a computer system.

17. A storage device, comprising:
a transmission interface, storage space and a controller, wherein:
the transmission interface is configured to perform communication between the storage device and a host device;
the storage space is configured to store data; and
the controller is coupled to the storage space and configured to:
receive, by using the transmission interface, M data read/write instructions sent by the host device, wherein the M data read/write instructions are in a one-to-one correspondence with M execution thread groups, each data read/write instruction comprises an indication identifier of a corresponding execution thread group, one indication identifier is used to identify one execution thread group, the M execution thread groups are determined by the host device by grouping N execution threads comprised in a target process according to an expected completion duration of the target process and a data transmission delay between the cores, each of N cores that are determined by the host device and that are used for executing the target process is in a one-to-one correspondence with each of the N execution threads, N≥2, one execution thread belongs to only one execution thread group, one execution thread group comprises at least one execution thread, and M≥2; and determine, according to the indication identifier, a data read/write instruction corresponding to each execution thread group, and transmit each data read/write instruction to the corresponding execution thread group by using the transmission interface to enable each execution thread within a thread group to perform a data read/write operation on the storage device according to the obtained data read/write instruction.

* * * * *